United States Patent Office 3,056,756
Patented Oct. 2, 1962

3,056,756
COMPOSITION COMPRISING SILOXANE ELASTO-
MER AND (TETRAMETHYLETHYLENEDIOXY)
DIMETHYLSILANE
Robert Arthur Hall, West Kilbride, Scotland, assignor to
Imperial Chemical Industries Limited, London, England, a corporation of Great Britain
No Drawing. Filed July 18, 1960, Ser. No. 43,293
Claims priority, application Great Britain Aug. 17, 1955
3 Claims. (Cl. 260—29.1)

The present invention relates to improvements in or relating to siloxane elastomer compositions and to additives for such compositions.

Siloxane elastomer compositions are widely known and are used in a variety of applications because of their many valuable and advantageous properties and because of the desirable properties of the elastomers obtained by curing these. For various purposes it is desirable to obtain varying properties in the resulting siloxane elastomers and to obtain certain properties it is desirable to be able to load siloxane elastomer compositions with large quantities of reinforcing fillers. Siloxane elastomer compositions are, however, frequently stored for considerable periods of time before curing to elastomers and it is normally necessary to rework them after storage and before curing. Hitherto in the compounding of siloxane elastomer compositions it has not been possible to incorporate more than a small quantity of a very finely divided silica, for example, a silica having a particle size of up to the order of 25 millimicrons and a specific surface of the order of at least 150 square metres/gram, without causing the siloxane elastomer composition to be unworkable or to become unworkable if stored for any length of time prior to curing. If more than a very limited amount of such a silica is incorporated it is usually necessary that the final working before curing should take place very soon after the compounding owing to "structure build-up." It is thus not possible to introduce large quantities of finely divided silicas into siloxane elastomer compositions in order to obtain after a few weeks storage a reinforced siloxane elastomer having an increased tensile strength, and a desired hardness.

An object of the present invention is to provide siloxane elastomer compositions having high reinforcing filler contents which can be stored for considerable periods before curing and which can be reworked after such storage and prior to curing. Another object is to provide such compounds which can be used to reinforce siloxane elastomers of increased tensile strength and high hardness. Other objects will appear hereinafter.

According to the present invention these objects are accomplished by a siloxane elastomer composition having incorporated therein (tetramethylethylenedioxy)dimethylsilane in amounts up to about 20 percent by weight of the organopolysiloxanes in the said composition.

It has now been found that if a quantity of the aforesaid silane is included as an additive in a siloxane elastomer composition it is possible to include large quantities of reinforcing silicas therein and that the compositions so obtained can be stored for several weeks before reworking. It has also been found that in order to obtain the desired increase in tensile strength, and desired hardness in the siloxane elastomer it is usually desirable that siloxane elastomer compositions should include from about 20 to about 55 parts of a reinforcing silica per 100 parts of the organopolysiloxanes present. It is however, possible for example, for special purposes to use amounts of reinforcing silica fillers in amount less than 20 parts and greater than 55 parts per 100 parts of organopolysiloxane.

Furthermore it has also been found that it is preferable to have at least 0.5 percent of (tetramethylethylenedioxy)dimethylsilane for the siloxane elastomer composition to have the required storage and milling properties and that if more than 20 percent is included the resulting siloxane elastomer composition may have a tendency on being worked to stick to the rollers of the mill and furthermore the elastomer produced on curing may tend to be spongy. It is, however, in general possible to get the desired properties using amounts of the silane not greater than about 10 percent and it is, in fact, preferred to use amounts in the range 0.5 to 5.0 percent since this gives the most advantageous properties.

The compositions of our invention are produced by compounding the ingredients in the normal manner. Thus, for example, in one method the organopolysiloxane is sheeted on a two roll mill, some filler added, the (tetramethylethylenedioxy)dimethylsilane added and the remainder of the filler added, after which the remaining solid ingredients are added in order of decreasing amount, followed by any other liquid ingredients and, if a curing agent is to be added at this stage, by the curing agent. Working of the mass is continued until the whole is thoroughly compounded.

The organopolysiloxanes employed in the compositions of this invention may generally comprise any of the known substantially linear organopolysiloxanes which are capable of being cured to elastomers, commonly called siloxane or silicon gums. The organo groups may be, for example, lower alkyl groups such as methyl or ethyl groups, aryl groups such as phenyl or tolyl groups or unsaturated groups such as vinyl or allyl groups. The ratio of organo groups to silicon atoms may, of course, vary but will normally be within the range from about 1.98:1 to about 2.05:1. The molecular weight may also vary within wide limits for example, from about $1 \times 10^5$ to about $10 \times 10^5$. Organopolysiloxanes of molecular weight from about $3 \times 10^5$ to about $7 \times 10^5$ are, however, preferred. Typical members of the class of organopolysiloxanes which may be used in the practice of this invention are illustrated in the examples hereinafter.

The compositions of our invention may, of course, contain in addition to the organopolysiloxane, reinforcing filler, silane and curing agent other additives, pigments and the like such as are used from time to time in such compositions.

The siloxane elastomer compositions of the invention can be stored for considerable periods, for example, up to 12 weeks and can be easily worked thereafter prior to curing whereas it has previously been necessary to carry out the final working and curing within a relatively short time, for example, 24 hours of compounding.

The invention is further illustrated by the following examples in which all parts are by weight.

EXAMPLE 1

A. *Preparation of (Tetramethylethylenedioxy) Dimethylsilane*

128 parts of dimethyldichlorsilane were added to 118 parts of pinacol and 372 parts of triethylamine in a vessel fitted with a stirrer and reflux condenser. The mixture was stirred for 8 hours without application of heat and thereafter refluxed for 4 hours. The mixture was then filtered and the filtered precipitate washed with benzene after which the filtrate and washings were distilled. 129 parts of (tetramethylethyenedioxy)dimethylsilane were obtained having a boiling point at atmospheric pressure of 152–153° C.

B. *Preparation of a Siloxane Elastomer Composition and Its Resulting Elastomer*

100 parts of a linear dimethylpolysiloxane having a ratio of methyl groups to silicon atoms of 2:1 and a viscosity of $1.7 \times 10^7$ cs. at 20° C. were mixed on cold differential rolls with 35 parts of a fume silica of average particle size 25 m$\mu$ and surface area 150 m.$^2$/g., 2.5 parts of (tetramethylethylenedioxy)dimethylsilane prepared as above and 3 parts of a benzoyl peroxide/polysiloxane fluid paste. The composition so obtained could be easily worked after storage for 3 weeks whereas a similar composition without the silane could not be reworked after that time.

The compounded siloxane elastomer compositions with and without the silane was cured for various times and the tensile strength, elongation at break and hardness of the resulting elastomers determined. These are recorded in the following table.

| Sample No. | Quantity of silane added (parts) | Period of storage at room temperature before processing and testing (weeks) | Oven cure | | Tensile strength (lb./sq. in.) | Elongation at break, percent | Hardness (B.S. deg.) |
|---|---|---|---|---|---|---|---|
| | | | Time (hr.) | Temp. (°C.) | | | |
| 1 | 0 | 0 | 1 | 150 | 640 | 340 | 67 |
| | | | 24 | 250 | 545 | 360 | 67 |
| | | 3 | | | Unworkable | | |
| 2 | 2.5 | 0 | 1 | 150 | 780 | 370 | 60 |
| | | | 24 | 250 | 620 | 280 | 63 |
| | | 3 | 1 | 150 | 860 | 340 | 58 |
| | | | 24 | 250 | 700 | 200 | 60 |

EXAMPLE 2

A siloxane elastomer composition was prepared as in Example 1 except that the 2.5 parts of (tetramethylethylenedioxy)dimethylsilane were replaced by 1 part and the 35 parts of fume silica replaced by 20 parts. The compounded elastomer composition so obtained could be easily worked after storage for 3 weeks and after an oven cure of 1 hour at 150° C., followed by 24 hours at 250° C. gave an elastomer having a tensile strength of 400 lb./sq. in., elongation at break 300 percent and hardness 32° B.S.

EXAMPLE 3

A siloxane elastomer composition was prepared as in Example 1 except that the 2.5 parts of (tetramethylethylenedioxy)dimethylsilane were replaced by 5 parts and the 35 parts of fume silica replaced by 55 parts. The siloxane elastomer composition so obtained could be easily worked after storage for 3 weeks and after an oven cure of 1 hour at 150° C. followed by 24 hours at 250° C. gave an elastomer having a tensile strength of 600 lb./sq. in., an elongation at break of 130 percent and hardness of 85° B.S.

EXAMPLE 4

100 parts of a linear methylphenylpolysiloxane having a viscosity of $2 \times 10^7$ cs. at 20° C. were mixed on cold differential rolls with 50 parts of the fume silica used in Example 1, 4.5 parts of (tetramethylethylenedioxy)dimethylsilane and 3 parts of a benzoyl peroxide/polysiloxane fluid paste. The composition so obtained could be easily worked after storage for 3 weeks whereas a similar composition without additive could not be reworked after that time. On curing at 150° C. for 1 hour the resulting elastomer had a tensile strength of 945 lb./sq. in., elongation at break 255 percent and hardness 66° B.S. A further sample of the siloxane elastomer composition cured at 250° C. for 24 hours gave an elastomer having a tensile strength of 745 lb./sq. in., elongation at break 150 percent and hardness 82° B.S.

EXAMPLE 5

A siloxane elastomer composition was prepared by mixing 100 parts of a linear dimethylpolysiloxane having a ratio of methyl groups to silicon atoms of 2:1 and a viscosity of $1.7 \times 10^7$ cs. at 20° C., on cold differential rolls with 45 parts of a precipitated silica having a particle size of 30 m$\mu$ and a surface area of 110 to 150 m.$^2$/g., 2.5 parts of (tetramethylethylenedioxy)dimethylsilane, and 3 parts of a benzoyl peroxide/polysiloxane fluid paste. The composition so obtained was much more easily worked after storage than a similar composition without the silane.

Siloxane elastomer compositions with and without the silane were cured for various times and the tensile strength, elongation at break and hardness of the resulting siloxane elastomers were determined and are recorded in the following table.

| Sample No. | Quantity of additive added (parts) | Oven cure | | Tensile strength (lb./sq. in) | Elongation at break, percent | Hardness, B.S. degrees |
|---|---|---|---|---|---|---|
| | | Time (hr.) | Temp. (°C.) | | | |
| 1 | 0 | 1 | 150 | 870 | 340 | 51 |
| | | 24 | 250 | 721 | 250 | 56 |
| 2 | 2.5 | 1 | 150 | 929 | 430 | 50 |
| | | 24 | 250 | 808 | 260 | 53 |

EXAMPLE 6

100 parts of a linear methylvinylpolysiloxane of viscosity $10^7$ cs. at 20° C. and having a ratio of organo groups to silicon atoms of about 2:1 and 0.02 percent of the organo groups being vinyl groups were compounded on cold differential rolls with 16 parts of (tetramethylethylenedioxy)dimethylsilane, 70 parts of a fume silica of average particle size 5–20 m$\mu$ and surface area 300 m.$^2$/g., 1 part of red iron oxide and 6 parts of a 2:4-dichlorbenzoyl peroxide/polysiloxane fluid paste. This composition could be easily worked after 3 days' storage and on curing by heating for 1 hour at 150° C. gave an elastomer of tensile strength 1385 lb./sq. in., elongation at break 775 percent and hardness 60° B.S.

Attempts to prepare a similar composition minus the silane resulted in failure to get the ingredients to compound together.

EXAMPLE 7

100 parts of the methylvinylpolysiloxane used in Example 6 were compounded with 35 parts of a fume silica of average particle size 10 to 40 m$\mu$ and surface area 175 m.$^2$/g., 6 parts of (tetramethylethylenedioxy)dimethylsilane, 1 part of red iron oxide and 3 parts of a 50/50 paste of 2:4-dichlorbenzoyl peroxide in a polysiloxane fluid. The composition so obtained could be easily worked after storage for 3 weeks. It could also be moulded and extruded without reworking after storage for 3 weeks. The elastomer obtained by curing the composition for 24 hours at 250° C. had a tensile strength of 740 lb./sq. in., elongation at break 160 percent and hardness 60° B.S.

A similar composition having the silane omitted could not be reworked, moulded or extruded after storage for 3 weeks.

EXAMPLE 8

A very soft siloxane elastomer composition was prepared by compounding together 100 parts of a linear dimethylpolysiloxane of viscosity $10^6$ cs. at 20° C. and having about 2 methyl groups per silicon atom, 10 parts of the fume silica used in Example 7, 0.7 parts of (tetramethylethylenedioxy)dimethylsilane and 1.5 parts of a 50/50 paste of 2:4-dichlorbenzoyl peroxide in a polysiloxane fluid.

This product could be easily reworked after storage for 2 months. The elastomer obtained by curing the composition for 1 hour at 150° C. had a tensile strength of 271 lb./sq. in. and elongation at break of 500 percent.

A similar composition containing no silane was capable of being reworked after storage for 2 months but only with very considerable difficulty and a much longer time was required.

EXAMPLE 9

100 parts of the organopolysiloxane used in Example 8 were compounded with 55 parts of the fume silica used in Example 6, 5 parts of (tetramethylethylenedioxy)dimethylsilane and 3 parts of a benzoyl peroxide/polysiloxane fluid paste. The composition so obtained could be easily reworked after storage for 1 week and on curing for 1 hour at 150° C. gave an elastomer having a tensile strength of 1400 lb./sq. in., elongation at break 375 percent and hardness 82° B.S.

Attempts to make a similar composition omitting the silane were successful only with the greatest difficulty and the composition obtained could be handled only with extreme difficulty. After storage for 1 week this composition could not be reworked.

EXAMPLE 10

100 parts of the organopolysiloxane used in Example 8 were compounded with 35 parts of the fume silica used in Example 7, 3 parts of (tetramethylethylenedioxy)dimethylsilane and 3 parts of a paste of benzoyl peroxide in a polysiloxane fluid. The composition so obtained could be reworked to its fresh state within 4 minutes on a two roll mill.

A similar composition containing no silane could be reworked only with the utmost difficulty.

This application is a continuation-in-part of my copending application Serial No. 595,105, filed July 2nd, 1956, now abandoned, the disclosure of which is incorporated herein by reference.

What I claim is:

1. A siloxane elastomer composition comprising a substantially linear organopoly siloxane capable of being cured to an elastomer and having incorporated therein (tetramethylethylenedioxy)dimethylsilane in amount from about 0.5% up to about 20 percent by weight of the organopolysiloxanes in the said composition.

2. A siloxane elastomer composition comprising a substantially linear organopoly siloxane capable of being cured to an elastomer and having incorporated therein (tetramethylethylenedioxy)dimethylsilane in amount from about 0.5% to not greater than about 10 percent by weight of the organopolysiloxanes in the said composition.

3. A siloxane elastomer composition comprising a substantially linear organopoly siloxane capable of being cured to an elastomer and having incorporated therein (tetramethylethylenedioxy)dimethylsilane in amount from about 0.5 to about 5.0 percent by weight of the organopolysiloxanes in the said composition.

No references cited.